(12) United States Patent
Kaufmann

(10) Patent No.: US 10,029,313 B2
(45) Date of Patent: Jul. 24, 2018

(54) TOOL HOLDER FOR A CUTTING INSERT AND PROCESS FOR MANUFACTURING THE TOOL HOLDER

(71) Applicant: Kennametal Inc., Latrobe, PA (US)

(72) Inventor: Igor Kaufmann, Nuremberg (DE)

(73) Assignee: KENNAMETAL INC., Latrobe, PA (US)

( * ) Notice: Subject to any disclaimer, the term of this patent is extended or adjusted under 35 U.S.C. 154(b) by 200 days.

(21) Appl. No.: 14/956,901

(22) Filed: Dec. 2, 2015

(65) Prior Publication Data
US 2016/0175938 A1     Jun. 23, 2016

(30) Foreign Application Priority Data

Dec. 19, 2014   (DE) .................. 10 2014 119 295

(51) Int. Cl.
| | |
|---|---|
| *B23B 27/04* | (2006.01) |
| *B23B 27/10* | (2006.01) |
| *B33Y 10/00* | (2015.01) |
| *B33Y 80/00* | (2015.01) |
| *B23B 29/04* | (2006.01) |

(52) U.S. Cl.
CPC ............ *B23B 27/10* (2013.01); *B23B 29/043* (2013.01); *B33Y 10/00* (2014.12); *B33Y 80/00* (2014.12); *B23B 27/04* (2013.01); *B23B 2250/12* (2013.01); *Y10T 407/14* (2015.01); *Y10T 407/25* (2015.01)

(58) Field of Classification Search
CPC ....... B23B 27/10; B23B 27/04; B23B 27/045; B23B 27/14; B23B 27/16; B23B 27/1607; B23B 27/1625; B23B 27/1637; B23B 27/22; B23B 29/043; Y10T 407/25; Y10T 407/14
See application file for complete search history.

(56) References Cited

U.S. PATENT DOCUMENTS

| | | | |
|---|---|---|---|
| 4,621,547 A | | 11/1986 | Yankoff |
| 4,848,198 A | * | 7/1989 | Royal ............... B23B 25/02 407/11 |
| 4,955,264 A | * | 9/1990 | Armbrust ........... B23B 25/02 407/11 |

(Continued)

FOREIGN PATENT DOCUMENTS

| | | | | |
|---|---|---|---|---|
| DE | 2261952 A1 | * | 6/1974 | ............ B23B 27/04 |
| DE | 3429842 | | 2/1986 | |

(Continued)

*Primary Examiner* — Ryan Rufo
(74) *Attorney, Agent, or Firm* — Matthew S. Bedsole

(57) ABSTRACT

The invention relates to a tool holder (10) for a cutting insert (18), having a tool holder body (12), a recess (16) for a cutting insert (18), a clamping element (20) that can tightly clamp a cutting insert (18) in the recess (16), and at least one cooling channel (40, 42, 44, 50, 70, 72) through which the coolant can be conducted to the cutting insert (18), characterized in that the cross-sectional area and/or the cross-sectional shape of the cooling channel (40, 42, 44, 50, 70, 72) changes along its length. The invention also relates to a process for manufacturing such a tool holder (10), wherein the clamping element (20) is manufactured along with at least one part of the tool holder body (12) in an additive layer process.

16 Claims, 7 Drawing Sheets

(56) References Cited

U.S. PATENT DOCUMENTS

| | | | |
|---|---|---|---|
| 5,718,156 A * | 2/1998 | Lagrolet | B23B 27/10 407/11 |
| 5,829,331 A * | 11/1998 | Mori | B23B 27/10 407/11 |
| 5,901,623 A * | 5/1999 | Hong | B23B 27/10 407/100 |
| 6,045,300 A * | 4/2000 | Antoun | B23B 27/10 407/11 |
| 7,959,384 B2 | 6/2011 | Breisch | |
| 8,696,259 B2 | 4/2014 | Hecht | |
| 8,827,598 B2 | 9/2014 | Henry | |
| 8,946,585 B2 * | 2/2015 | Kappmeyer | B22F 3/1055 219/121.6 |
| 2002/0122698 A1 * | 9/2002 | Lagerberg | B23B 27/10 407/11 |
| 2002/0127067 A1 * | 9/2002 | Lagerberg | B23B 29/046 407/11 |
| 2002/0189413 A1 * | 12/2002 | Zurecki | B23B 27/10 82/1.11 |
| 2007/0283786 A1 | 12/2007 | Kappmeyer | |
| 2008/0124180 A1 * | 5/2008 | Breisch | B23B 27/10 407/110 |
| 2010/0178117 A1 | 7/2010 | Watanabe et al. | |
| 2010/0196105 A1 * | 8/2010 | Amstibovitsky | B23B 27/10 407/11 |
| 2011/0070037 A1 * | 3/2011 | Baker | B23B 27/10 407/11 |
| 2011/0305531 A1 * | 12/2011 | Amstibovitsky | B23B 27/10 407/11 |
| 2012/0230780 A1 * | 9/2012 | Henry | B23B 27/10 407/11 |
| 2013/0129428 A1 * | 5/2013 | Henry | B23B 27/04 407/11 |
| 2013/0202372 A1 * | 8/2013 | Hecht | B23B 27/10 407/107 |
| 2013/0236256 A1 * | 9/2013 | Kaufmann | B23B 27/04 407/107 |
| 2014/0030033 A1 * | 1/2014 | Luik | B23B 27/10 407/11 |
| 2014/0099168 A1 | 4/2014 | Schaefer | |
| 2014/0133924 A1 * | 5/2014 | Oren | B23B 29/043 407/11 |
| 2015/0132074 A1 * | 5/2015 | Boissonnet | B23B 29/043 407/11 |
| 2015/0352640 A1 * | 12/2015 | Frota de Souza Filho | B23B 27/10 407/11 |
| 2016/0339523 A1 * | 11/2016 | Graf | B23B 27/10 |

FOREIGN PATENT DOCUMENTS

| | | | | |
|---|---|---|---|---|
| DE | 3429842 A1 * | 2/1986 | | B23B 27/10 |
| DE | 3740814 A1 * | 6/1989 | | B23B 27/10 |
| DE | 19937315 | 2/2001 | | |
| DE | 102004032093 | 1/2006 | | |
| DE | 202012004900 U1 * | 8/2012 | | B23B 27/10 |
| DE | 102011016148 A1 * | 10/2012 | | B23B 27/10 |
| DE | 102013212459 A1 * | 1/2014 | | B23B 27/10 |
| DE | 102014207507 A1 | 10/2015 | | |
| DE | 102014208134 A1 | 11/2015 | | |
| EP | 0534450 A2 * | 3/1993 | | B23B 27/045 |
| GB | 1369096 | 10/1974 | | |
| JP | 07-051905 A * | 2/1995 | | B23B 27/12 |
| JP | 07-227702 A * | 8/1995 | | B23B 27/04 |
| JP | 09-192905 A * | 7/1997 | | B23B 27/04 |
| JP | 2006-088297 A * | 4/2006 | | B23B 27/10 |
| WO | WO2015110132 A1 | 7/2015 | | |

* cited by examiner

TOOL HOLDER FOR A CUTTING INSERT AND PROCESS FOR MANUFACTURING THE TOOL HOLDER

PRIORITY CLAIM

This patent application claims priority under the United States Patent Statute including 35 USC § 119 to German Patent Application No. 102014119295.8 filed on Dec. 19, 2014, which the entirety thereof is incorporated by reference herein.

DESCRIPTION

The invention relates to a tool holder for a cutting insert, comprising a tool holder body, a recess for a cutting insert, a clamping element that can tightly clamp a cutting insert in the recess, and at least one cooling channel through which coolant can be conducted to the cutting insert.

Such tool holders are known in a number of embodiments. The cutting insert can be used to machine a workpiece, for example when turning or milling.

The coolant is used to improve the cutting performance of the cutting insert. However, depending on the particular geometry of the tool holder, it can be very challenging to position the cooling channel for the coolant in the tool holder in such a way that its properties are not impaired. For example, for a tool holder in which the clamping element is designed to be a single piece together with the tool holder body, the cooling channel must be guided through the material cross-section to which the clamping element having the tool holder body is connected.

The object of the invention is to further develop a tool holder of the type mentioned at the outset such that the feeding of coolant to the cutting insert is improved.

According to the invention, this objective is achieved by having the cross-sectional area and/or the cross-sectional shape of the cooling channel change along its length. This makes it easier to monitor how much coolant reaches which section of the cutting insert.

According to a preferred embodiment, the cooling channel is curved. This makes it possible to optimally adapt it to the tool holder, for example to the geometry of a clamping element.

According to an embodiment of the invention, the cross-sectional area of the cooling channel decreases from a connection to an outlet. As a result, the distribution of coolant can be controlled, especially if there are multiple outlets.

The cooling channel can have at least one polygonal cross-sectional shape per section or an elliptical cross-sectional shape. The appropriate selection of the cross-sectional shape can influence the effect of the cooling channel on the strength of the section of the tool holder in which it is arranged.

According to a preferred embodiment, the cooling channel has a main channel and at least one branch. This makes it possible to conduct the coolant to different places.

According to an embodiment of the invention, a branch extends to the clamping element and this branch extends at an angle of approximately 45° relative to a longitudinal axis of the tool holder body. This has comparatively little effect on the strength of the material section to which the clamping element having the tool holder body is connected.

The clamping element is preferably provided with a clamping element channel that opens into at least one outlet on a side of the clamping element facing the recess. As a result, the coolant can be guided directly to the surface of the cutting insert which is clamped in the recess.

It is also possible for a side channel to branch off from the clamping element channel and open into at least one outlet on a face of the clamping element. Because of this, the coolant can be guided in a targeted manner to a cutting edge of the cutting insert that is arranged forward in the axial direction.

According to an embodiment of the invention, a plate seat channel can be provided in the tool holder body, with which a plate seat channel coolant can be guided to a cutting insert that is arranged in the recess. This makes it possible to guide coolant to the open areas of the cutting insert as well.

According to an embodiment, the plate seat channel has a branch that opens into at least one outlet on a side surface of the tool holder body, below the recess. It is also possible for the plate seat channel to have a branch that opens into at least one outlet on a face of the tool holder body below the recess. With these outlets, the coolant can be guided in a targeted manner to a lateral or forward open space of the cutting insert.

Depending on the requirements, the outlet can have an elliptical or polygonal cross-sectional shape. As a result, the coolant stream can be optimized.

It is also possible for multiple outlets to be arranged side by side to optimally and precisely direct the coolant to the desired location. It is also possible for the outlets to form a honeycomb structure.

The tool holder body and/or the clamping element preferably comprise metal particles that are fused with each other.

According to the invention, the aforementioned objective is also achieved by a process for manufacturing a tool holder wherein the clamping element is manufactured along with at least one part of the tool holder body via an additive layer process. In such a process, similar to rapid prototyping, the tool holder is manufactured from a plurality of material layers, each of which is applied to an underlying material layer and firmly bonded to it. This can be done via laser sintering, for example. With little effort, such a process can be used to manufacture a tool holder in which the cooling channel has a very complex contour, in particular a contour that cannot be manufactured using traditional methods.

To minimize production costs, the tool holder can be manufactured as a hybrid body, namely from a solid shaft part that is, for example, milled and drilled and an attached head part that is manufactured via an additive layer process and contains cooling channels having complicated geometry.

The invention will be explained below with reference to a preferred embodiment that is portrayed in the accompanying drawings. In the drawings.

Figure 1:
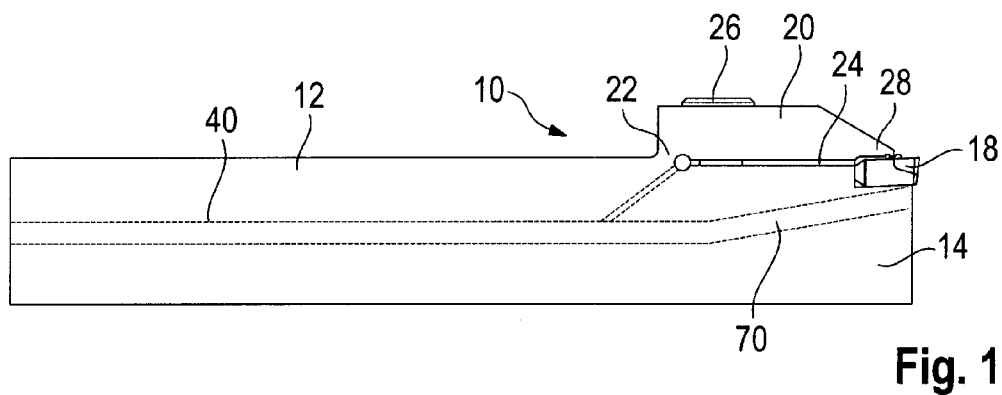
FIG. 1 shows a side view of a tool holder according to the invention, wherein a cutting insert is arranged in a recess of the tool holder.

In Figures, a tool holder 10 is shown that has a shaft 12 which can be used to clamp the tool holder in a machine tool, such as a lathe.

At one end of the shaft, which is referred to as the "front end" here, the shaft is provided with an abutment section 14 on which a recess 16 for a cutting insert 18 is provided. Together, the shaft 12 and the abutment section 14 form a tool holder body.

The cutting insert 18 is of the type with which grooves and recesses in particular can be turned. However, at variance from the embodiment shown, the concept according to the invention may in principle also be used with any other kind of tool holder.

A clamping element 20, which here is arranged above the plane defined by the top side of the shaft 12, is provided for clamping the cutting insert 18 in the recess 16. The clamping element 20 is connected to the shaft 12 as a single piece by a bending section 22. The abutment section 14 and the clamping element 20 are separated by a gap 24 on the side of the bending section 22 that faces away from the shaft 12, i.e. "in front of" it.

A clamping device 26, which can be used to press the clamping element 20 against the abutment section 14, i.e. in a direction in which the gap 24 narrows, is arranged on the clamping element 20. As a result, a front end 28 of the clamping element 20 can tightly clamp the cutting insert 18 in the recess.

The clamping device 26 here is a clamping screw whose head is accessible on the top side of the clamping element 20 and is clamped into the threaded hole in the abutment section 14.

Figure 2:
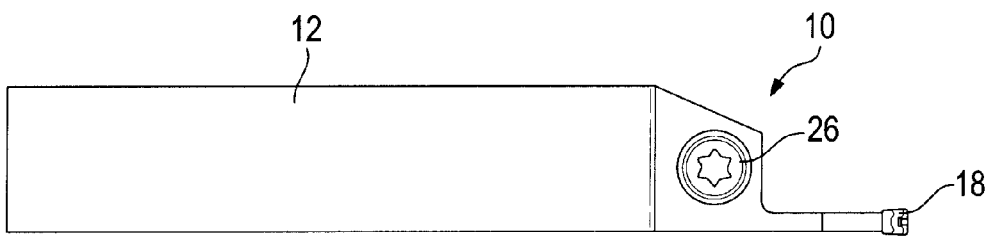
FIG. 2 shows a plan view of the tool holder from FIG. 1.
Figure 4:
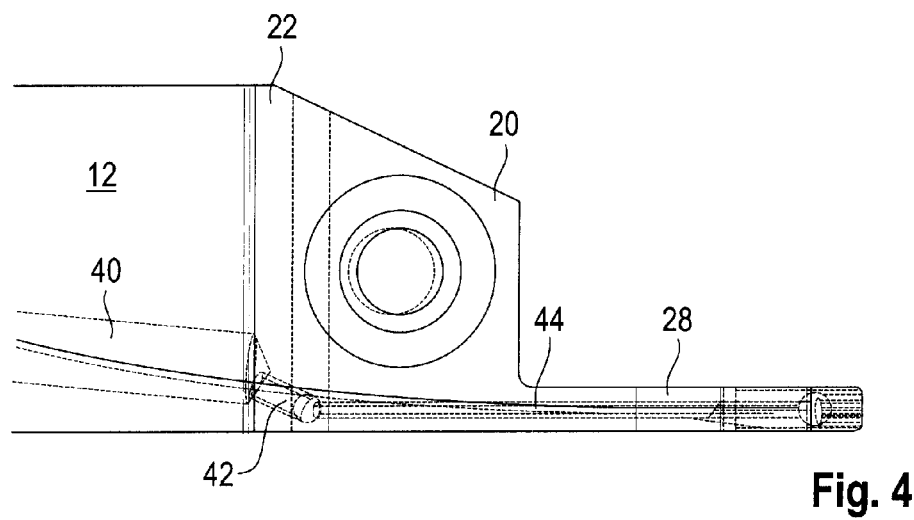
FIG. 4 shows a plan view of the section of the tool holder shown in FIG. 3.
Figure 5:
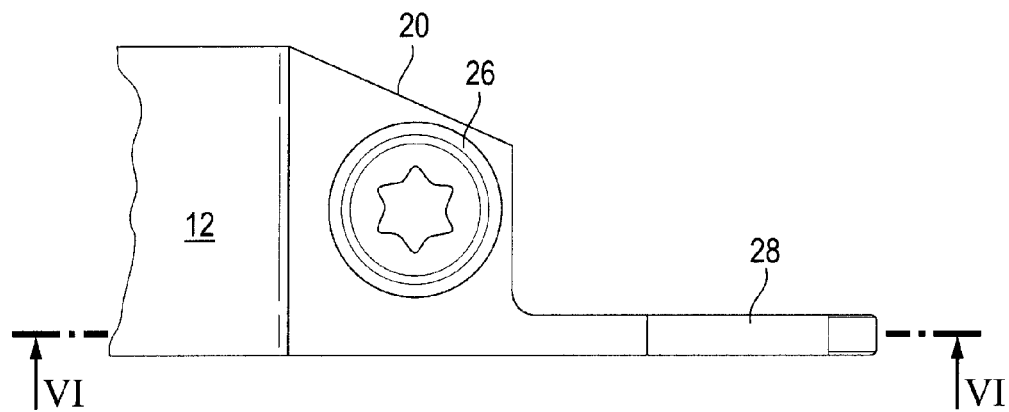
FIG. 5 shows a view corresponding to that of FIG. 4, wherein a sectional plane is indicated.

As shown in FIGS. 2, 4 and 5 in particular, the abutment section 14 and the front end 28 of the clamping element 20 was designed like a sword, i.e. very narrow and long. In particular, the width of the abutment section 14 and of the front end 28 of the clamping element 20 is less than 20% the width of the shaft, in particular on the order of 15%.

The tool holder 10 is provided with multiple cooling channels in order to be able to feed coolant to various places in the area of the cutting insert 18.

A cooling channel 40 is provided in the tool holder body 12, which cooling channel 40 extends from a connection (not shown here) on an end of the tool holder 10 facing away from the recess 16 to the front end.

A branch 42, which extends through the bending section 22, branches off from the cooling channel 40. The branch 42 extends at an angle of approximately 45° relative to the longitudinal axis of the tool holder body 12.

Figure 3:
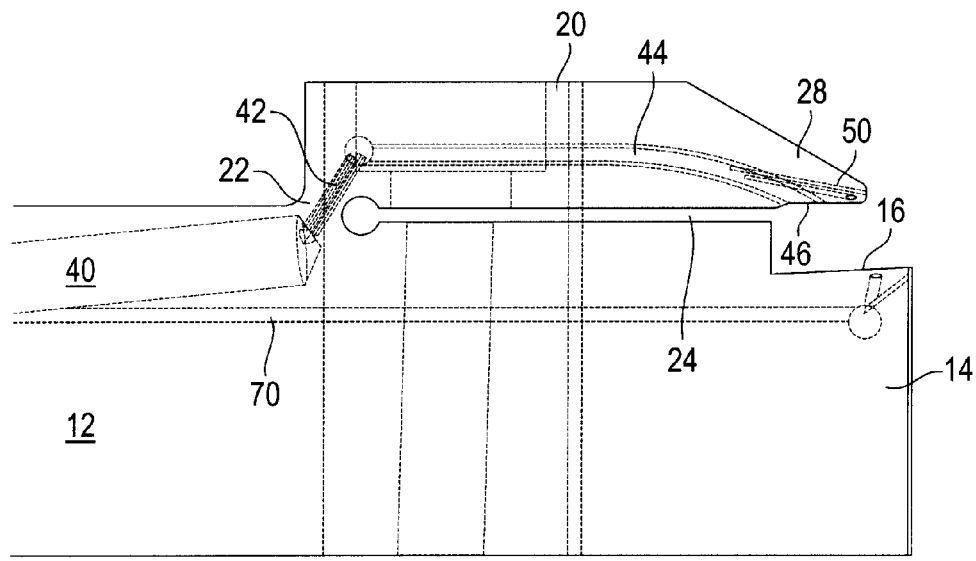
FIG. 3 shows the front end of the tool holder from FIG. 1 on an enlarged scale, wherein no cutting insert is arranged in the recess.
Figure 6:
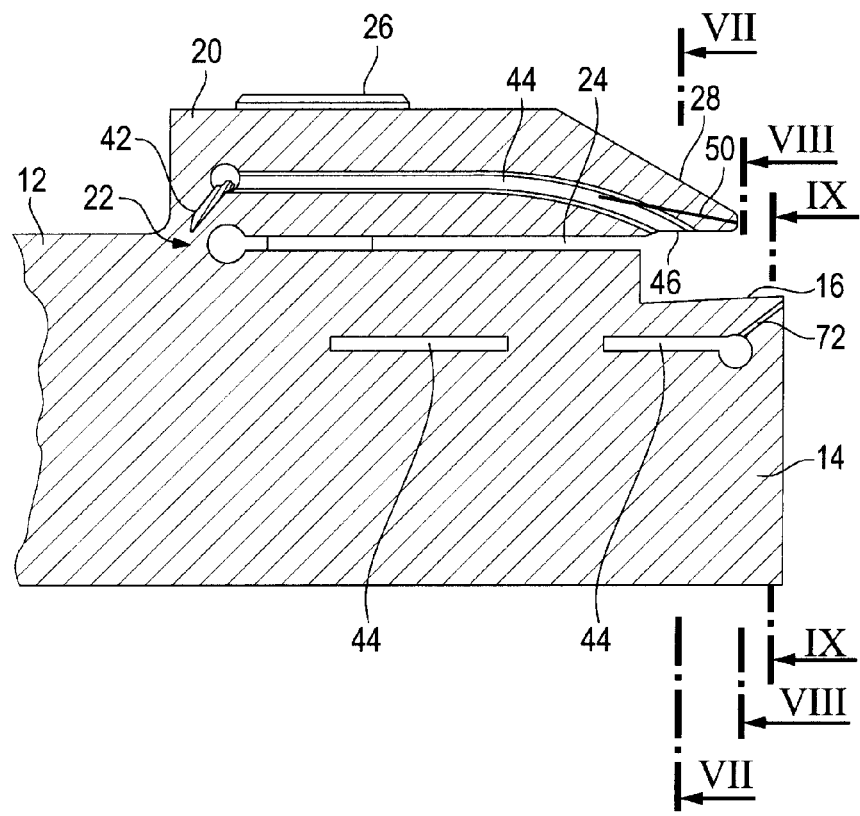
FIG. 6 shows a section along the plane VI-VI of FIG. 5.
Figure 7:
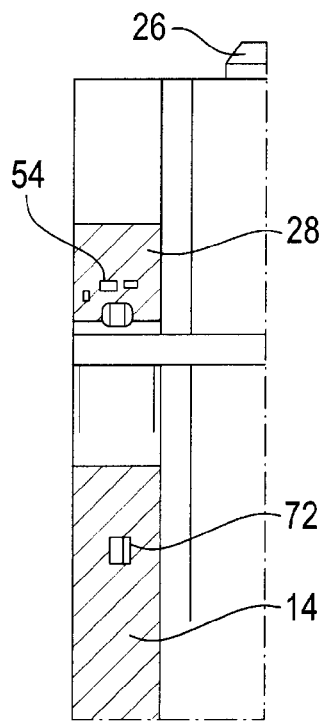
FIG. 7 shows a section along the plane VII-VII of FIG. 6.
Figure 8:
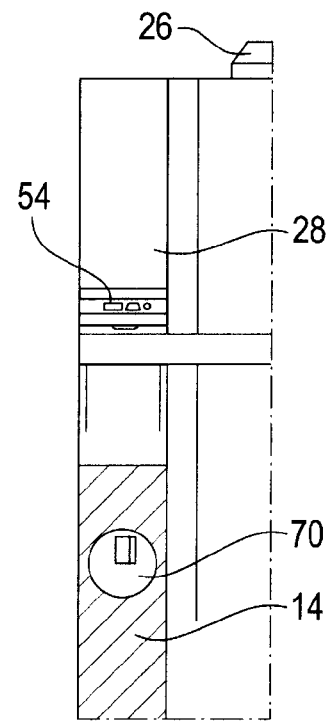
FIG. 8 shows a section along the plane VIII-VIII of FIG. 6.
Figure 9:
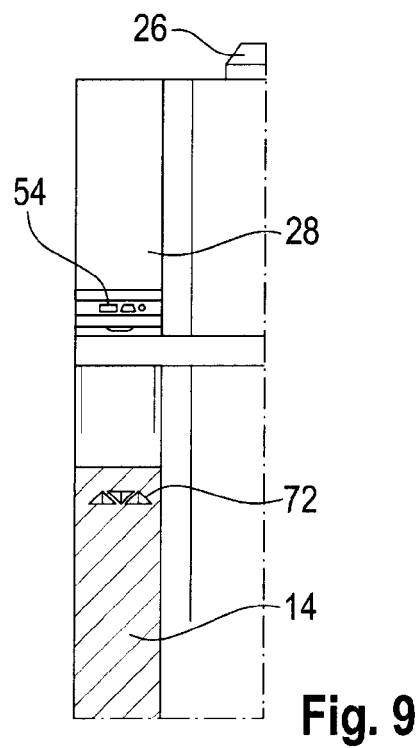
FIG. 9 shows a section along the plane IX-IX of FIG. 6.
Figure 10:
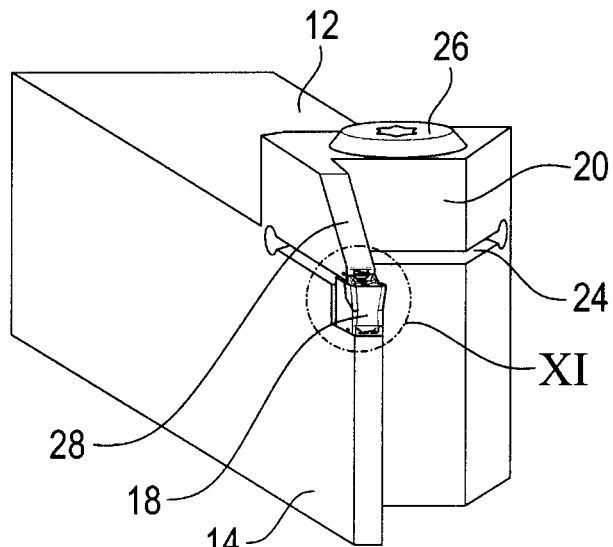
FIG. 10 shows a perspective view of the tool holder from FIG. 1.
Figure 11:
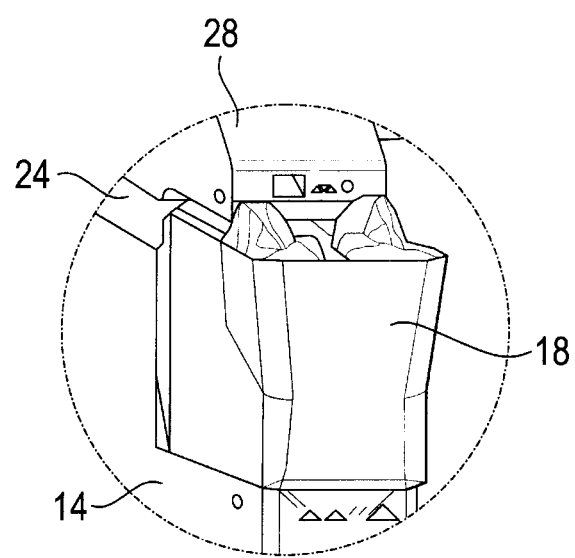
FIG. 11 shows the detail XI from FIG. 10 on an enlarged scale.

The branch 42 continues in a clamping element channel 44 which runs along the clamping element towards the front end of the tool holder 10, i.e. towards the recess 16. As shown in FIGS. 3 and 6, the clamping element channel 44 runs in a curve and therefore—in the broadest sense—follows the course of the clamping element, which tapers at its front end 28.

The clamping element channel 44 opens into an outlet 46 that faces the recess 16. If the cutting insert is mounted in the recess 16, the coolant escaping from the outlet 46 reaches the surface of the cutting insert 18, along which it flows as a coolant stream 48 that is directed forward to the front cutting edge (see FIG. 15).

The clamping element channel 44 branches off into multiple side channels 50 that each have a much smaller cross section than the clamping element channel 44. The side channels 50 open at the front end 28 of the clamping element 20, namely in part to laterally disposed outlets 52 and in part to outlets 54, 56, 58 arranged at the front. The laterally disposed outlet 52 ensures that a coolant stream 60 is guided to a minor cutting edge of the cutting insert 18 (see FIG. 15).s The outlets 54, 56, 58 arranged at the front face ensure that a coolant stream 62 (see also FIG. 15) is guided towards the major cutting edge of the cutting insert 18.

Figure 12:
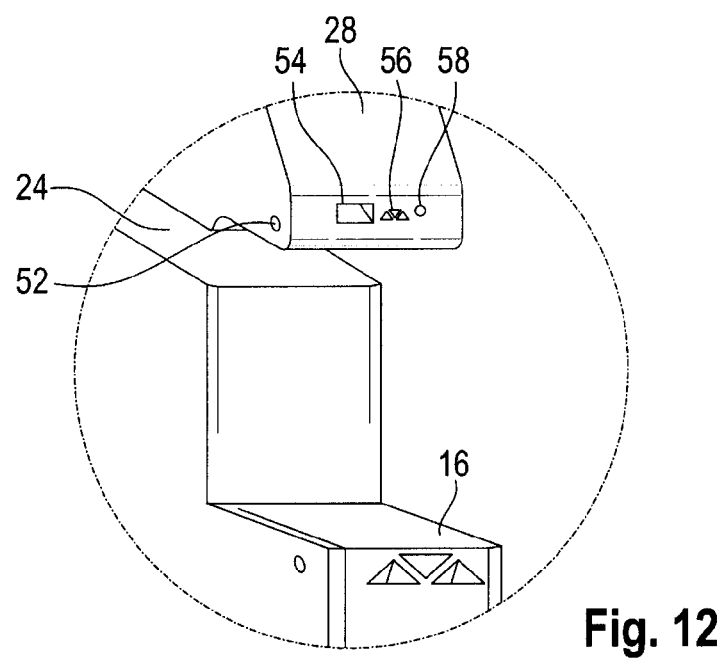
FIG. 12 shows an even larger view of the detail XI from FIG. 10, wherein no cutting insert is arranged in the recess.
Figure 13:
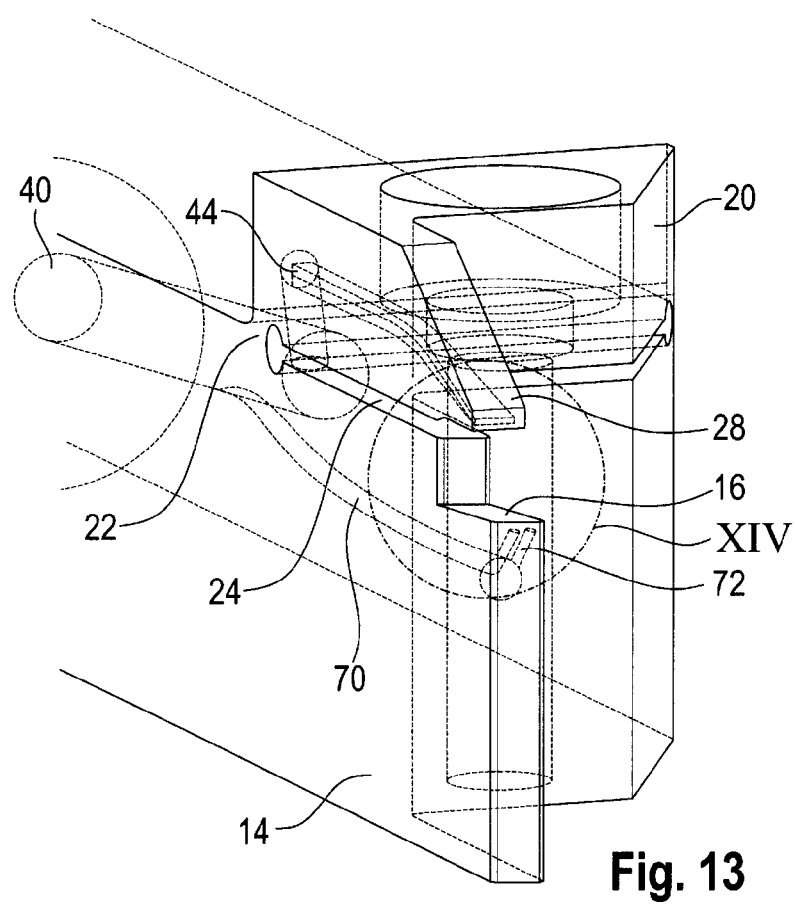
FIG. 13 shows a schematic, perspective representation of the front section of the tool holder, wherein the internal cooling channels are shown.
Figure 14:
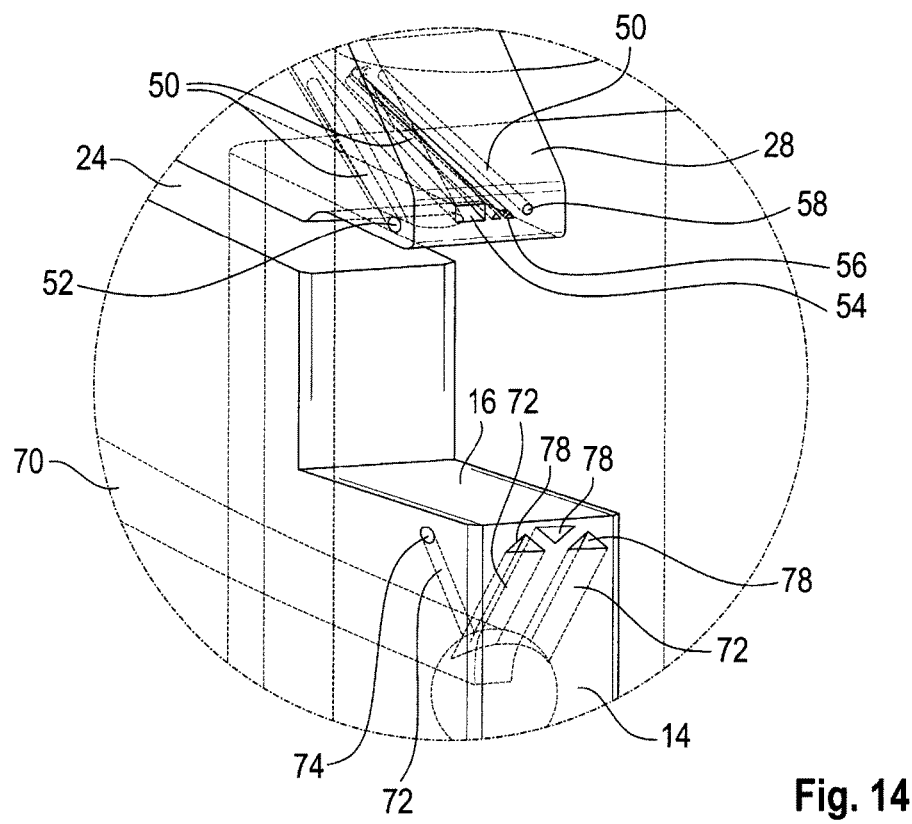
FIG. 14 shows the detail XIV from FIG. 13.
Figure 15:
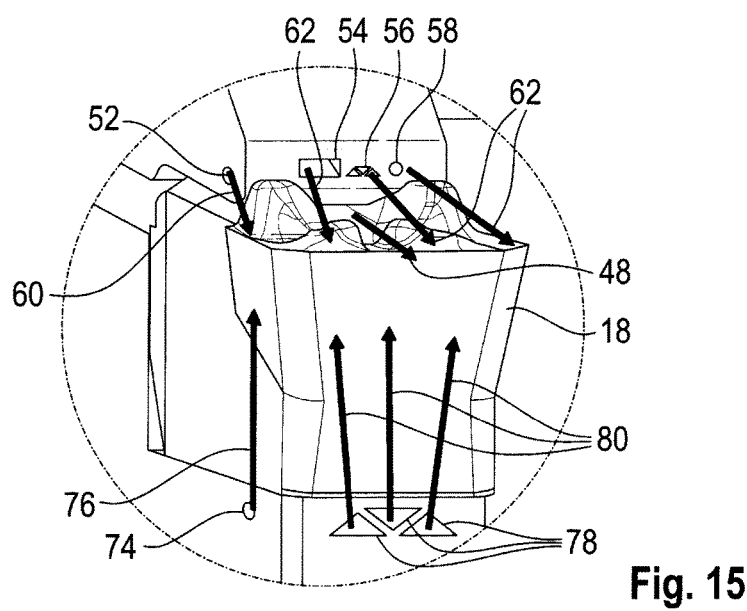
FIG. 15 shows a view corresponding to that of FIG. 12, wherein a cutting insert is arranged in the recess and the direction of flow of the coolant to various surfaces of the cutting surface is indicated.

In particular, FIGS. 12, 14 and 15 show that the cross-sectional shape of the outlets 52, 54, 56, 58 can differ. The outlet 52 has a round cross section. The outlet 54 has a rectangular cross section. The outlet 56 comprises multiple small individual openings that together form a honeycomb-like outlet. On the other hand, the outlet 58 is circular.

The cross-sectional shapes shown are examples that illustrate the fact that different cross-sectional shapes which are adapted to the respective application can be used, for example, to guide a high-volume coolant stream (for example, via outlet 54) or multiple smaller individual streams (for example, via outlet 56) to a desired spot on the cutting insert 18, or also to the workpiece that is machined using the cutting insert 18.

Cooling channels 40, 42, 44, 50 can also have different cross-sectional shapes. Apart from a conventional, circular cross-sectional shape, elliptic, polygonal (such as trapezoidal or parallelogram-shaped or rectangular) or other cross-sectional shapes can be used. This generally depends on the respective requirements. For example, a flat but relatively wide cooling channel has less of an effect on the flexural strength of the tool holder body 12 or of the clamping element 20 than a cooling channel having a round cross section and the same cross-sectional area.

A plate seat channel 70 also branches off from cooling channel 40 as a branch that runs to the front end of the tool holder body 12. The plate seat channel is provided to guide coolant to the cutting insert 18, specifically to its open spaces.

The plate seat channel 70 branches out at its front end into various junctions 72 that lead to other outlets. Similar to as in clamping element 20, lateral outlets 74 are provided here with which coolant can be directed to the lateral open spaces below the minor cutting edges of the cutting insert 18 (see arrow 76 in FIG. 15). Furthermore, frontal outlets 78 are provided that each have a triangular cross-section (see in particular FIGS. 12 and 14). A coolant stream can be directed from these outlets 78 to an open space below the major cutting edge of the cutting insert 18 (see the arrows 80 in FIG. 15).

As FIG. 14 shows in particular, the branches 72 that lead to the outlets 78 also already have a triangular cross section. However, it is possible that the branches 72 initially branch off from the plate seat channel 70 having a circular cross section, which then changes to a triangular cross section towards the outlets 78.

Figures show that the various cooling channels have different cross-sectional areas. It is clearly apparent that the branches 72 that lead to the outlets 78 have a larger cross-sectional area than the branches leading to the outlets 74, and the plate seat channel 70 in turn has a much larger cross-sectional area than the branches 72. Because of this, it is possible with little effort to control what amount of coolant reaches which outlet.

The described tool holder can at least be manufactured section by section what is known as an additive layer process, i.e. a process in which the entire body is manufactured via a plurality of material layers applied one atop another. This process is generally known from 3D rapid prototyping. Preferably, thin layers of metal powder are used—which can, for example, be suitably melted and fused with each other by applying energy using a laser—are used for a tool holder.

To reduce the production costs, the tool holder can also be manufactured as a hybrid part having: a conventional shaft section that comprises a solid, machined metal part; and a front section of the tool holder connected to said metal part, in which front section the more complex cooling channels are located. Cooling channels having a changing cross-sectional area and/or non-circular cross sections can hardly be manufactured using conventional machining methods.

Each of the patents and other documents identified herein are hereby incorporated in their entirety by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A tool holder for a cutting insert, comprising:
   a shaft with an abutment section;
   a recess formed in the abutment section for receiving a cutting insert;
   a clamping element for clamping a cutting insert in the recess, the clamping element having a front end; and
   a main cooling channel formed in the shaft; and
   a clamping element channel formed in the clamping element and in fluid communication with the main cooling channel,
   wherein the clamping element channel has a plurality of side channels formed in the front end of the clamping element, each side channel of the plurality of side channels having an outlet for providing a stream of coolant, wherein the outlet for at least two side channels of the plurality of side channels have a different cross-sectional shape.

2. The tool holder of claim 1, wherein the outlet for one of the plurality of side channels has a circular cross-sectional shape.

3. The tool holder of claim 1, wherein the outlet for one of the plurality of side channels has a rectangular cross-sectional shape.

4. The tool holder of claim 1, wherein the outlet for one of the plurality of side channels has multiple individual openings that together form a cluster.

5. The tool holder of claim 1, wherein each side channel of the plurality of side channels has a smaller cross-sectional area than a cross-sectional area of the clamping element channel.

6. The tool holder of claim 1, wherein at least one of the plurality of side channels includes a laterally disposed outlet for providing coolant to a minor cutting edge of the cutting insert.

7. The tool holder of claim 1, further comprising a branch extending between the main cooling channel to the clamping element channel for fluidly connecting the main cooling channel to the clamping element channel.

8. The tool holder of claim 7, wherein the branch extends at an angle relative to a longitudinal axis of the tool holder body, wherein the angle is 45 degrees.

9. The tool holder of claim 1, further comprising a plate seat channel in fluid communication with the main cooling channel.

10. The tool holder of claim 9, wherein the plate seat channel has a plurality of branches, each branch the plurality of branches having an outlet for providing a stream of coolant from underneath the cutting insert.

11. The tool holder of claim 10, wherein the outlet for at least two branches of the plurality of branches have a different cross-sectional shape.

12. The tool holder of claim 11, wherein the outlet for one of the plurality of branches has a circular cross-sectional shape.

13. The tool holder of claim 11, wherein the outlet for one of the plurality of branches has a triangular cross-sectional shape.

14. The tool holder of claim 11, wherein each branch of the plurality of branches has a smaller cross-sectional area than a cross-sectional area of the plate seat channel.

15. The tool holder of claim 1, wherein a cross-sectional shape of the main cooling channel is different than a cross-sectional shape of the clamping element channel.

16. The tool holder of claim 1, wherein the stream of coolant from each side channel on a front face of the front end is provided to a major cutting edge of the cutting insert.

* * * * *